(12) United States Patent
Neely et al.

(10) Patent No.: US 7,117,754 B2
(45) Date of Patent: Oct. 10, 2006

(54) TORQUE RIPPLE SENSOR AND MITIGATION MECHANISM

(75) Inventors: Jason Neely, Albuquerque, NM (US); Steven D. Pekarek, Salem, MO (US); Jason M. Banaskavich, Manchester, MO (US); Daniel S. Stutts, Rolla, MO (US)

(73) Assignee: The Curators of the University of Missouri, Columbia, MO (US)

(*) Notice: Subject to any disclaimer, the term of this patent is extended or adjusted under 35 U.S.C. 154(b) by 0 days.

(21) Appl. No.: 10/281,883

(22) Filed: Oct. 28, 2002

(65) Prior Publication Data

US 2004/0079173 A1  Apr. 29, 2004

(51) Int. Cl.
  *G01L 3/02* (2006.01)
  *G01L 3/10* (2006.01)
  *G01L 3/12* (2006.01)
  *G01L 3/14* (2006.01)

(52) U.S. Cl. ................................. 73/862.333
(58) Field of Classification Search ............... 73/862, 73/333, 562.325, 450, 660, 862.333, 862.338; 310/323.11, 8.2, 8.7, 323.03, 323.02, 322, 310/328; 318/72.7, 800, 721, 661, 649; 364/574; 381/71; 376/372
See application file for complete search history.

(56) References Cited

U.S. PATENT DOCUMENTS

| | | | | |
|---|---|---|---|---|
| 3,578,996 A | * | 5/1971 | Balamuth | 310/325 |
| 3,702,948 A | * | 11/1972 | Balamuth | 310/323.18 |
| 3,841,845 A | * | 10/1974 | Keller | 117/51 |
| 4,019,073 A | * | 4/1977 | Vishnevsky et al. | 310/322 |
| 4,056,743 A | * | 11/1977 | Clifford et al. | 310/21 |
| 4,240,020 A | * | 12/1980 | Okuyama et al. | 318/721 |
| 4,240,296 A | * | 12/1980 | Kolodziej | 73/650 |
| 4,448,059 A | * | 5/1984 | Kondo et al. | 73/35 |
| 4,491,010 A | | 1/1985 | Brandt et al. | |
| 4,511,827 A | | 4/1985 | Morinaga et al. | |
| 4,566,316 A | | 1/1986 | Takeuchi | |
| 4,577,500 A | | 3/1986 | Mishiro | |
| 4,635,483 A | | 1/1987 | Mishiro | |
| 4,658,190 A | | 4/1987 | Miyazaki et al. | |
| 4,703,214 A | | 10/1987 | Mishiro | |
| 4,705,980 A | | 11/1987 | Mishiro | |
| 4,728,843 A | | 3/1988 | Mishiro | |
| 4,814,683 A | * | 3/1989 | Okamoto et al. | 318/800 |
| 5,274,313 A | * | 12/1993 | Amrhein | 318/629 |
| 5,313,950 A | * | 5/1994 | Ishikawa et al. | 600/462 |
| 5,352,950 A | * | 10/1994 | Shirasaki | 310/323 |

(Continued)

OTHER PUBLICATIONS

"Torque Ripple Minimization in Switched Reluctance Motor Drives by PWM Current Control", Iqbal Husain, and M. Ehsani, IEEE Transactions on Power Electronics, vol. 11, No. 1, Jan. 1996, pp. 83-88.

(Continued)

*Primary Examiner*—Max Noori
*Assistant Examiner*—Octavia Davis
(74) *Attorney, Agent, or Firm*—Greer, Burns & Crain, Ltd.

(57) ABSTRACT

A torque ripple sensor and method for torque ripple sensing and/or mitigation. A piezoelectric sensor is positioned relative to a motor so that torque fluctuations due to torque ripple of the motor are transmitted to the sensor, resulting in strain of a piezoelectric element. A resulting signal can be amplified and conditioned for determining a magnitude of the torque ripple and/or fed into a feedback loop for applying current control or a counter-torque to the motor for torque ripple mitigation.

33 Claims, 7 Drawing Sheets

U.S. PATENT DOCUMENTS

| | | | |
|---|---|---|---|
| 5,416,375 A * | 5/1995 | Funakubo et al. | 310/323 |
| 5,616,999 A * | 4/1997 | Matsumura et al. | 318/632 |
| 5,636,287 A * | 6/1997 | Kubli et al. | 381/71.2 |
| 5,656,779 A * | 8/1997 | Bronowicki | 73/668 |
| 5,668,744 A * | 9/1997 | Varadan et al. | 700/280 |
| 5,777,232 A * | 7/1998 | Kurita et al. | 73/664 |
| 5,777,449 A | 7/1998 | Schlager | |
| 5,821,669 A * | 10/1998 | Shin | 310/323.03 |
| 5,821,725 A | 10/1998 | Wang et al. | |
| 5,986,385 A * | 11/1999 | Atsuta | 310/323.06 |
| 6,140,792 A * | 10/2000 | Kameyama et al. | 318/685 |
| 6,392,327 B1 * | 5/2002 | Lewis et al. | 310/316.01 |
| 6,483,197 B1 * | 11/2002 | Masberg et al. | 290/40 C |
| 6,498,449 B1 * | 12/2002 | Chen et al. | 318/434 |
| 6,498,451 B1 * | 12/2002 | Boules et al. | 318/661 |
| 6,825,592 B1 * | 11/2004 | Magnussen et al. | 310/323.02 |

OTHER PUBLICATIONS

"Design of a Piezoelectric Sensor-Based Controller for Mitigation of Torque Ripple in a Brushless DC Machine", J. Neely, S. Pekarek, B. Beccue, N. Benavides, M. Ortbals, D. Stutts, and J. Banaskavich, SAE Technical Paper Series, Paper No. 2002-01-3223, Oct. 29, 2002, pp. 1-10.

"Beating Torque Ripple in Brushless Servos—Infranor USA" website, retrieved from the Internet http://infranorusa.com/support/articles/btribs.cfm, retrieved Mar. 22, 2002, pp. 1-2.

Greg Paula, Associate Editor, "The rise of VSR motors", Mechanical Engineering Magazine, Feb. 1998, retrieved from the Internet http://www.memagazinel.org/backissues/february98/features/risevsr/risevsr.html, retrieved Jun. 5, 2002, pp. 1-5.

Tinghsu Su, Satomi Hattori, Muneaki Ishida, and Takamasa Hori, "Suppression Control Method for Torque Vibration of AC Motor Utilizing Repetitive Controller With Fourier Transform," IEEE Transactions on Industry Applications, vol. 38, No. 5, p. 1316-1325, Sep.-Oct. 2002.

Jason Neely, "Design and Construction of a Controller for Mitigation of Torque Ripple in a Brushless DC Machine", Unpublished Thesis, University of Missouri—Rolla, pp. i-vii, 1-51.

* cited by examiner

TORQUE RIPPLE SENSOR AND MITIGATION MECHANISM

FIELD OF THE INVENTION

The present invention generally relates to the field of electric machines.

BACKGROUND OF THE INVENTION

Permanent magnet synchronous machines such as motors with non-sinusoidal back-EMF's often produce significant torque ripple. Torque ripple is a harmonic variation in motor output torque that typically occurs as a result of the interaction of back-EMF and stator current harmonics, as well as cogging torque. Torque ripple is undesirable during operation of a motor due to the vibration, noise, and variation in drive torque that it causes.

Solutions to the problem of torque ripple by those in the art typically fall into one of two categories: improving the design of the motor; and controlling the current input to the motor. For controlling the current input, a significant amount of work has been done to mitigate torque ripple by, for example, controlling stator current harmonics. To determine the values of stator currents that are input to the motor, several methods focus on open-loop systems requiring extensive analysis of a particular machine to determine optimal current harmonics, either for torque ripple mitigation, minimization of RMS current amplitudes, or a combination of both. Particular compensation models rely upon estimates of the torque ripple based on complex mathematical models. However, these models may not always accurately predict the amplitude and/or phase of the actual torque ripple, which may vary considerably as a function of load and drive voltage conditions.

To characterize the level of torque ripple or provide model validation, example systems employ in-line torque transducers. However, the transducers require a particular degree of bandwidth, and a relatively large inertia between the torque transducer and the load. In another example of measuring torque ripple, the user measures machine currents during normal operation of a machine, and uses current injection to reproduce currents and a static torque measurement system to measure torque.

SUMMARY OF THE INVENTION

The present invention addresses the problem of torque ripple by sensing torque fluctuations due to torque ripple and, if desired, compensating for the torque ripple via a control system applied to the machine that is producing torque ripple or by an active vibration control using a system that couples to the machine to provide a countertorque ripple that is out of phase to the torque ripple produced by the machine. The invention provides a method and apparatus for torque ripple sensing and mitigation in which reaction forces between a permanent magnet synchronous machine and a fixed point are sensed using a piezoelectric sensor functioning as an aspect of a closed-loop control system. The reaction forces of the permanent magnet machine include forces due to machine torque ripple. An example of a fixed point may be a substrate to which the machine is mounted. The piezoelectric sensor is positioned relative to the motor and the fixed point so that torque fluctuations of the motor are transmitted to a piezoelectric element as reaction forces, resulting in strain of the element. This strain is converted to a signal for sensing a magnitude of torque ripple and/or for processing by the control system or active vibration control.

The sensed torque ripple provides feedback that is used to determine stator current harmonics utilizing a controller that preferably is based on cost-function minimization. The inputs to the controller are the torque ripple harmonics, and the outputs are stator current harmonics. Preferably, the input/output of the controller is structured in a form that requires only standard numerical integration, without the need for search algorithms. Alternatively, an active vibration control receives the torque ripple input and creates a torque ripple out of phase to cancel the torque ripple produced by the machine. The control system manipulates current harmonics in response to torque ripple measurements, while the active vibration control introduces a counter-moment to offset the sensed torque ripple. The preferred method allows a feedback mechanism to mitigate both the electromagnetic torque ripple and the cogging torque ripple. In practice, feedback control systems according to the present invention benefit from working directly with torque ripple by avoiding the complexity of establishing and controlling predetermined current harmonics.

A method of mitigating torque ripple is provided by the present invention. In a preferred embodiment of the method, machine torque ripple is sensed using a piezoelectric device to produce a signal. The signal is fed into a closed-loop control system, which manipulates current harmonics in response to torque ripple measurements. Use of a sensor provides flexibility and robust control. The torque ripple sensor can be manufactured simply and inexpensively, and the sensor allows a high dynamic frequency range. The sensor of the present invention can be developed into an easily manufactured and easily implemented tool for various machine applications.

DETAILED DESCRIPTION OF THE INVENTION

Figure 1:
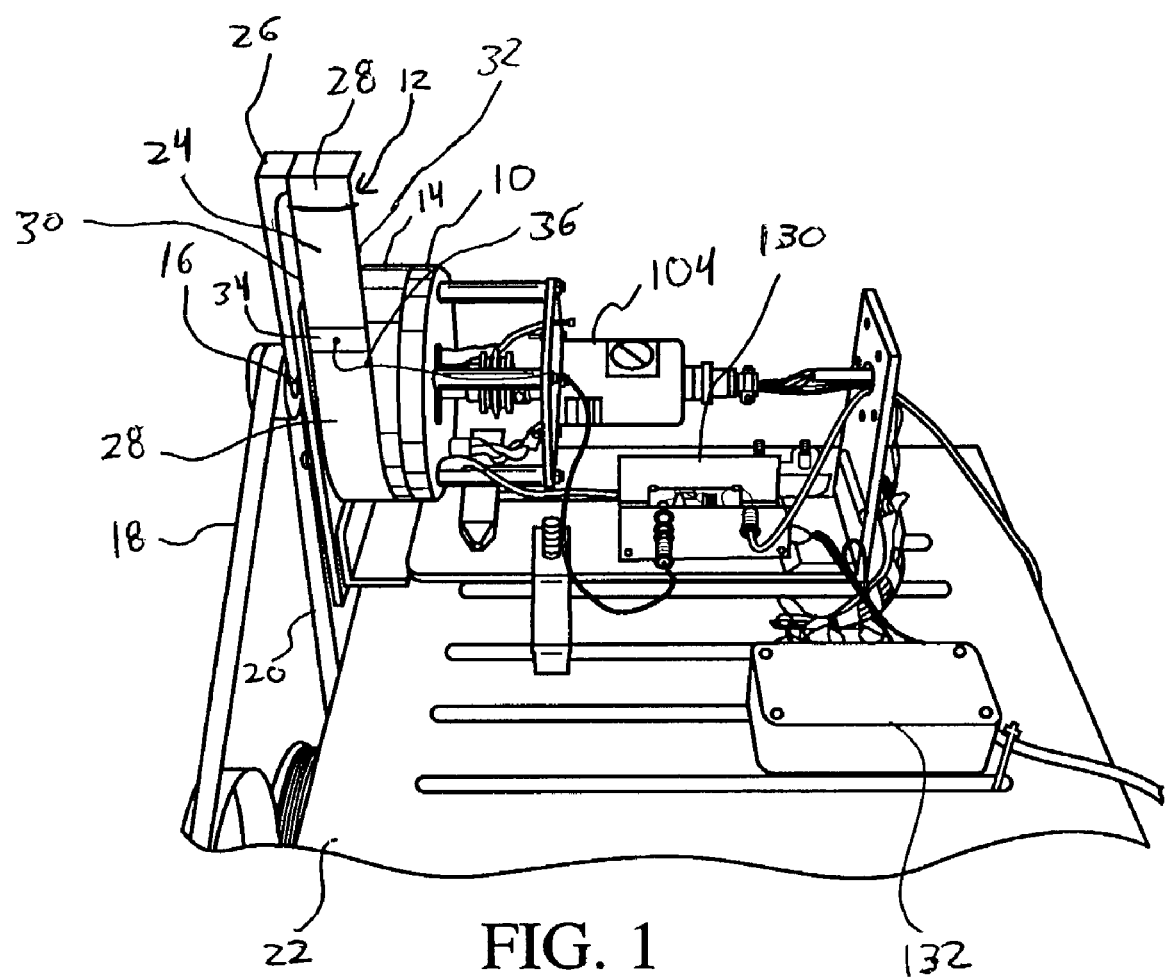
FIG. 1 is a perspective view of a device having a motor that is fitted with a film-based torque ripple sensor according to an embodiment of the present invention.

The present invention employs a piezoelectric element to sense reaction forces between a permanent magnet machine and a fixed point relative to the permanent magnet machine, such as a substrate to which the permanent magnet machine is mounted. The reaction forces result from torque fluctuations attributable to torque ripple during operation of the permanent magnet synchronous machine, for example, as a motor or generator. Other contributors such as mass unbalance may affect reaction forces as well. A torque ripple sensor including the piezoelectric element is mounted or otherwise attached or positioned at a position relative to the permanent magnet machine and the fixed point so that reaction forces due to torque ripple of the permanent magnet machine cause some deformation of the piezoelectric element. The deformation may be strain in a poling direction of the piezoelectric element, transverse to the poling direction, or in between. The torque ripple sensor of the invention may have a variety of embodiments, and may be positioned in a number of locations. For example, the piezoelectric sensor may be stretched between a motor housing and a mount. Alternatively, the sensor may be sandwiched and compressed between the motor and a mounting substrate, or positioned between the motor and a device for affixing the motor to the substrate, such as a fastening device.

When the piezoelectric element of the torque ripple sensor is deformed by rotational disturbances in the machine housing, the piezoelectric element generates an electric charge. Distortions in the element are related as a voltage proportional to its strain that can be amplified, conditioned, and used in a controller for measurement and/or feedback control. A preferred torque ripple sensor of the present invention provides a signal proportional to the amplitude of the torque ripple found in various permanent magnet synchronous machines. Piezoelectric material allows torque ripple sensing over a relatively high dynamic range (for example, 0.01 Hz–1 GHz), and a sensor made from piezoelectric material can be easily manufactured and made durable. Particular piezoelectric materials include various ceramics and polymers. Exemplary materials include, but are not limited to, polyvinylidene fluoride (PVDF) and lead zirconate titanate (PZT). Opposing surfaces of the piezoelectric element may be connected to a lead or leads for transmitting the voltage signal produced by the strain in the piezoelectric element. The piezoelectric element may be coated with a conductive element or layer to transmit voltage from the element.

In another embodiment, a single insulating layer would be used. One surface of the piezoelectric element may be connected to ground, in which case a single lead may be connected for transmitting the voltage signal. The electrode that is not in contact with an insulating layer would be connected to a mount that was grounded. This would effectively place the potential of the bottom electrode at ground potential and would require one less insulator and one less lead from the sensor.

In a preferred embodiment, a signal from a feedback control system is used to reduce the torque ripple, and hence concomitant vibration and noise. Alternatively or additionally, an active vibration canceling actuator reduces the vibration transmitted to the mount based on the signal produced by the torque ripple sensor.

Turning now to the drawings, a permanent magnet synchronous machine is shown in FIG. 1 embodied in a motor 10 fitted with an exemplary torque ripple sensor, which in the first embodiment is a film-type sensor 12, according to a first embodiment of the present invention. An exemplary motor used in a setup performed by the inventors is a permanent magnet synchronous machine produced by Ecycle that is operated as a brushless dc motor. The motor 10 contains a motor housing 14 and a rotor shaft 16, which rotates along an axis. The rotor shaft 16 is connected to a suitable load 18 by appropriate methods. The motor housing 14 is connected to a fixed frame 20 supporting the motor 10, and the frame in turn is connected to a fixed substrate 22. The motor 10 is electrically coupled to a current input (not shown).

To sense torque ripple of the motor, the film-type sensor 12 is attached to the motor housing 14. The film-type sensor includes a piezoelectric element such as a piezoelectric film 24 that senses rotational disturbances attributable to torque ripple. To define a space for suspending the film-type sensor, a motor mount 26 such as a bracket connected to the fixed frame 20 extends in a direction away from the motor housing 14. The mount 26 acts as an outrigger for the motor 10. The particular position of the motor mount 26 may vary. A suitable attachment mechanism, such as bolts (not shown), may be used to attach the mount 26 to the frame 20.

The film-type sensor 12 including the piezoelectric film 24 is suspended and stretched between an edge of the housing 14 of the motor and a point of the fixed motor mount 26 away from the motor. For example, the film-type sensor 12 may be attached to the mount 26 and to the housing 14 using adhesive, such as an adhesive tape 28. Connection between the film-type sensor 12 and the motor housing 14 may be direct or indirect, so long as the element 24 is positioned such that it is strained axially due to relative motion between the motor 10 and the substrate to which it is mounted 22 (in this case, indirectly through mount 26) in response to torque fluctuations in the motor as it operates.

The piezoelectric film 24 in the embodiment shown in FIG. 1 is a dielectric film, such as PVDF or other piezoelectric polymer film, made from long polymer strands that possess a strong dipole along its thickness, perpendicular to the axis of motion. In this configuration, subtle rotation of the motor housing 14 occurs, at least partially due to torque ripple of the motor 10. Though other factors can contribute to the rotation, the reaction forces will not be at the same frequencies as those caused by torque ripple. The rotation axially stretches and releases the film 24 disposed between the housing 14 and the fixed mount 26. The axial displacement of the film 24 produces a change in the dimensions of the element, which changes the free charge present on front and back conductive surfaces 30, 32 of the element, producing an electric field and a resultant voltage signal proportional to the strain. The film 24 may be positioned at various angles relative to the housing 14 to produce a similar effect, though one end of the film should be connected to an fixed point external to the machine 10 (such as the mount 26).

By "fixed" it is intended that the point (such as the mount 26) is in a fixed position with respect to a position of an electric machine. However, a "fixed" point may not be absolutely fixed, as it is contemplated that both the point and the machine may instead be both moving, while the machine also exhibits relative movement with respect to the point, such as in a vehicle, for example. Thus, when the term "fixed" is used herein, it is not intended to restrict the invention to absolutely fixed points, but to a point where movement of the machine relative to the fixed point can be determined.

For carrying the produced voltage to a suitable mechanism to measure and/or mitigate the torque ripple, an electrode 34 is applied to one or both of the surfaces 30, 32, connected to one or more leads 36. There are various ways to connect the electrode 34 and the leads 36, such as conductive glue, copper tape, soft clip, etc. In a preferred embodiment, the electrode 34 on either surface 30, 32 is a conductive layer, such as a layer of silver ink or nickel plating. The electrode 34 may be formed at an exposed area of the film 24, while remaining areas of the film are covered with a non-conductive coating. The leads 36 may be coupled to a measuring mechanism (not shown in FIG. 1) and/or a feedback mechanism. The feedback mechanism preferably mitigates the torque ripple based on the voltage signal from the torque ripple sensor 12.

Figure 2:
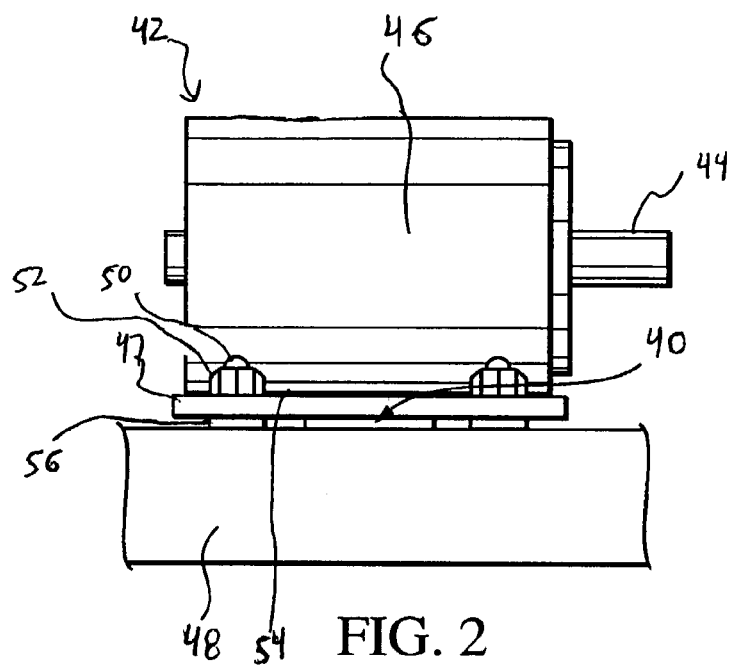
FIG. 2 is a schematic perspective view of a motor and housing fitted with a plate-type sensor according to another embodiment of the present invention.

The film-type sensor 12 shown in FIG. 1 is a non-limiting, illustrative embodiment of a torque ripple sensor that indicates torque ripple of a motor by axially stretching and contracting transverse to the poling direction of the element (the film 24). Alternatively, a torque ripple sensor may be configured or positioned to be strained by compression in the poling direction of the piezoelectric element. For example, a second embodiment torque ripple sensor, a plate-type sensor 40, is shown in FIG. 2 fitted with a motor 42, such as a permanent magnet synchronous machine or an induction motor. Other types of machines are contemplated, including wound rotor synchronous machines, switched reluctance machines, reluctance machines, and stepper machines, among others. A rotor shaft 44 of the motor 42 may be connected to a suitable load (not shown). A housing 46 of the motor, at an external portion or section 47, is mounted to a fixed substrate 48. The external portion or section 47 may be a bracket fixedly mounted to the housing 46, for example, or an integral part of the housing frame. A suitable connecting device, for example, a pair of bolts 50 with corresponding nuts 52, may be used to secure the mount to the substrate and/or to a housing of the motor. In an alternative embodiment, a bottom portion of the motor housing 46, without the external portion or section 47 as shown in FIG. 2, may be mounted directly to the substrate 48. In such an embodiment, the bolts 50 may extend through apertures at an outer portion (such as a lower surface 54) of the motor housing 46, connected to nuts 52 within the motor housing.

Figure 3A:
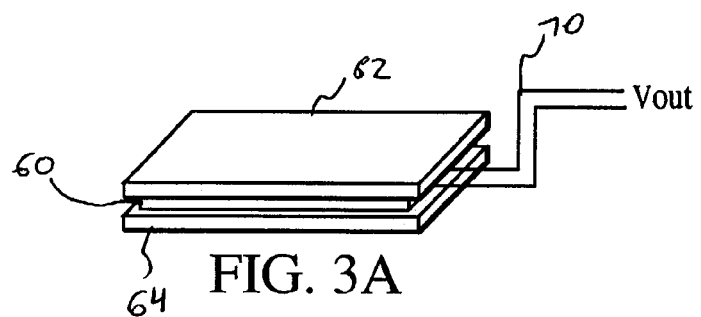
FIG. 3A is a perspective view of a plate-type sensor.
Figure 3B:
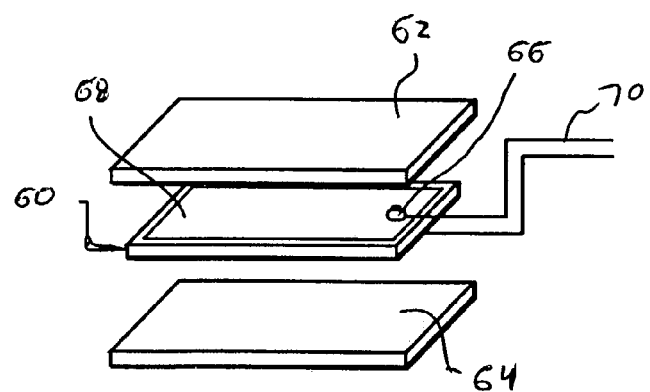
FIG. 3B is an exploded view of a plate-type sensor.

The plate-type sensor 40 is disposed between the housing 46 and the mounting substrate 48. Spacers, such as a pair of washers 56, are disposed between the housing 46 and the substrate 48 to create a clearance for the plate-type sensor 40. The created clearance should be substantially equal to the height of the plate-type sensor 40 so that the sensor abuts the external portion or section 47 (or the motor housing 46 directly, in an alternative embodiment). As shown in FIGS. 3A and 3B, the plate-type sensor 40 preferably includes a rectangular piezoelectric element 60, for example PZT or thick (non-film-type) PVDF, sandwiched between first and second (upper and lower, as shown) rectangular non-conductive ceramic elements 62, 64. Electrodes 66 and conductive layers 68 are attached to upper and lower surfaces of the piezoelectric element 60, respectively, and the electrodes are coupled to a pair of leads 70 for connecting to a mechanism for measuring and/or mitigating torque ripple. The conductive layers 68 need not cover the entire surface of the element 60.

Alternatively, a single electrode 66 and conductive layer 68 may be attached to an upper surface of the element 60 while a conducting layer (without an electrode) is connected to the lower surface of the element, respectively. The electrode 66 may be coupled to a single external lead 70 for connecting to a mechanism for measuring and/or mitigating torque ripple. The lower plate 64 is rested (unmounted) or mounted to the fixed mounting substrate 48 with conductive adhesive or bolts (not shown) connected to ground, or otherwise connected to ground in a suitable fashion. It will be appreciated that alternative planar shapes for the piezoelectric element 60 and non-conductive plates 62 are possible.

The plate-type piezoelectric element 60 preferably has a dipole in the direction of its thickness. An exemplary piezoelectric element 60 was obtained by the present inventors from Channel Industries, of Santa Barbara, Calif. By fitting the piezoelectric sensor 40 between the motor housing 46 and the fixed mounting substrate 48, rotational vibration of the motor housing due to torque ripple is transmitted to the piezoelectric sensor. This compresses the plate-type element 60, producing an axial strain on the element in the direction of its thickness, and accordingly producing a proportional voltage.

In an alternative embodiment, a portion of the motor housing 46 may be connected to another fixed substrate (not shown) by a suitable connection mechanism (not shown). Connecting the housing 46 to the other substrate in particular embodiments may be useful for structural integrity.

Figure 4A:
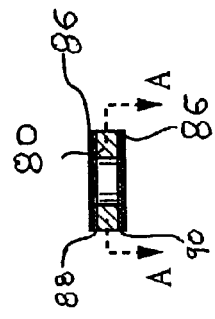
FIG. 4A shows a washer-shaped piezoelectric element.
Figure 4B:
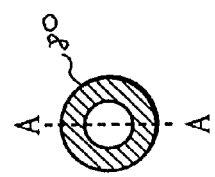
FIG. 4B is a sectional view of a washer-type sensor.
Figure 4:
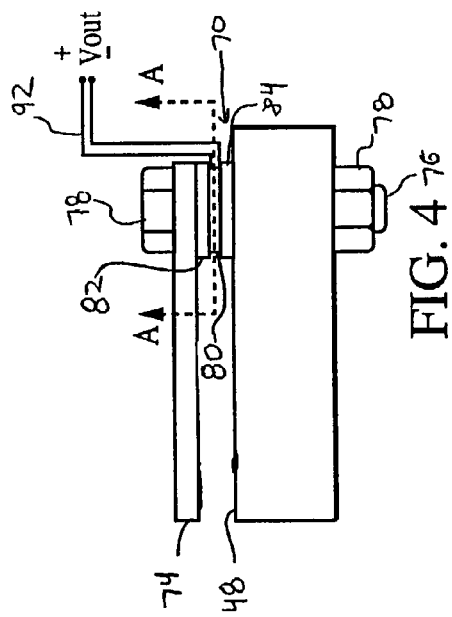
FIG. 4 is a schematic perspective view of a motor mount fitted with a washer-type sensor according to a preferred embodiment of the present invention.

A third preferred embodiment of the torque ripple sensor is shown in FIGS. 4, 4A, and 4B. A washer-type sensor 70 acts as a mounting washer for a motor having a housing 74, of which a lower surface is shown. The housing 74 is affixed to the substrate 48, preferably by mounting bolts 76. The washer-type sensor 70 is disposed around one or more of the mounting bolts 76. The bolt 76 is removably secured with upper and lower nuts 78. The washer-type sensor 70 is axially disposed between the lower surface of the motor housing 74 and an upper surface of the substrate 48. The upper nut 78, preferably located within the frame of the housing 76, provides tight contact between the washer-type sensor 70, the housing, and the substrate 48.

As shown in FIG. 4 and 4B, the washer-type sensor 70 is preferably similar in configuration to the plate-like sensor 40 of FIGS. 2 and 3A–3B, but with a different planar shape. The washer-type sensor 70 senses strain in the poling direction, using the longitudinal effect similar to the plate-type sensor 40, as opposed to the transverse effect used in the film-type sensor 24. The washer-type sensor 70 includes a central annular piezoelectric element 80, for example PZT, sandwiched between upper and lower (as shown in FIG. 4 and 4B) annular washers 82, 84, for example steel washers, having non-conductive insulating layers 86. Other rigid material is contemplated in place of the washers 82, 84. Preferably, the layers 86 are embodied in a non-conductive coating, such as an inert ceramic coating or a non-conductive polymeric coating of sufficient density, and are applied between the element 80, the housing 74, and the substrate 48 for insulation, since most motors and mounts are conductive. Though the PVDF film-type sensor 12 comes with its own non-conductive coating, the plate-type and washer-type sensors 40, 70 (PZT and PVDF) preferably have separate insulation. The annular piezoelectric element 80 has a dipole in the direction of thickness of the element. Upper and lower electrodes 88, 90 are disposed in openings of the non-conductive layers 86 of the annular piezoelectric element 80. The electrodes 88, 90 are attached to leads 92 for transmitting voltage produced by the element 80. Rotational vibration of the motor due to torque ripple produces reaction forces resulting in compression along the thickness of the annular piezoelectric element 80 between the upper and lower annular washers 82, 84 and a voltage proportional to its strain.

In an alternative embodiment, a single insulating layer 86 is used. The electrode 90 not in contact with the insulating layer is connected to ground, via the housing 74 or the substrate 48. This effectively places the potential of the electrode 90 at ground and requires one less insulating layer 86 and one less lead 92. In yet another alternative embodiment, the washer-type sensor 70 is disposed above both the housing 74 and the substrate 48. An additional spacer (not shown) may be placed between the housing 74 and the substrate. In this case, rotational vibration of the housing 74 compresses the element 80 between the housing and the upper nut 78 to produce a voltage. It will be appreciated that variations on these embodiments are possible.

The piezoelectric element 24, 60, 80 should have a sufficient thickness to supply an adequate voltage signal during deformation, without requiring so much pressure (force divided by area of the element, assuming even pressure distribution) that the element is damaged from the transmitted rotational disturbance from the motor. A reasonable bottom signal for accurate sensing is greater than approximately 20 mV. For example, for the washer-type element 80 of FIGS. 4–4B, having an inner radius $R_i$ and an outer radius $R_o$, the affected area A is equal to $\pi (R_o^2 - R_i^2)$. The stress σ applied to the element due to rotational vibration transmitted as force F, assuming even pressure distribution, is σ=F/A, which needs to be less than $\sigma_{max}$ for the PZT element. However, typically, the thicker the element, the larger electric field is required to pole the element. It is contemplated that a thin film may be used for the piezoelectric element. The thin film may be deposited on a surface, such as the lower washer 90 or a separate substrate, and poled into place. It is to be understood that the relative thicknesses of the sensors shown are not to be limited to that shown, and in fact, if a thin film is used for the piezoelectric element, the thicknesses of the elements 60, 80 shown in FIGS. 2–4B are greatly exaggerated.

The piezoelectric element measures time-varying changes in strain, corresponding to torque ripple, among other things. The signal from the piezoelectric element 24, 60, 80 is composed of several frequencies due to various sources, including mass unbalance and torque ripple. In a permanent magnet synchronous machine torque ripple is at least partially generated by the back-EMF signal (which has a fundamental component equal to the rotational speed of the machine and harmonic frequency components at primarily 3×, 5×, and 7× (odd multiples of the rotation speed)). Specifically, the interaction of the back-EMF and the stator currents (which also contains odd harmonics) produces torque ripple components at harmonics of multiples of 6 times the rotor electrical rotational speed. Torque ripple is also generated in part by the cogging torque, which is produced when rotor magnets attempt to align with stator slots. The cogging torque harmonics also occur at multiples of six times the rotor electrical rotational speed. Hence, the frequencies are basically known, but the amplitude of the torque ripple, which varies with load and drive conditions, is typically not known. The piezoelectric sensor obtains a signal linearly proportional to the torque ripple. This signal may then be use in a feedback control system to compensate (reduce) the torque ripple.

A description of a non-limiting example of a feedback control system and method follows, applied to a BDC motor 10 fitted with a film-type sensor 12, as shown by example in FIG. 1. However, the present invention is not intended to be limited to the particular mitigation method and system described below. In the present invention, the piezoelectric torque ripple sensor 12 detects the reaction forces of the motor housing 14 resulting from torque ripple. In a preferred method, the torque ripple is substantially eliminated by controlling the amplitude and phase of the permanent magnet machine's stator current harmonics. The stator current harmonics are determined using control laws that require measured or estimated values of torque ripple as feedback. The goal is to eliminate multiples of the phase number times 2, for example, the $6^{th}$ harmonic of the torque ripple in 3-phase machines (such as machine 10), for five-phase machines, multiples of 10 times the rotor electrical speed, for 6-phase, multiples of $12^{th}$, etc.

Figure 6:
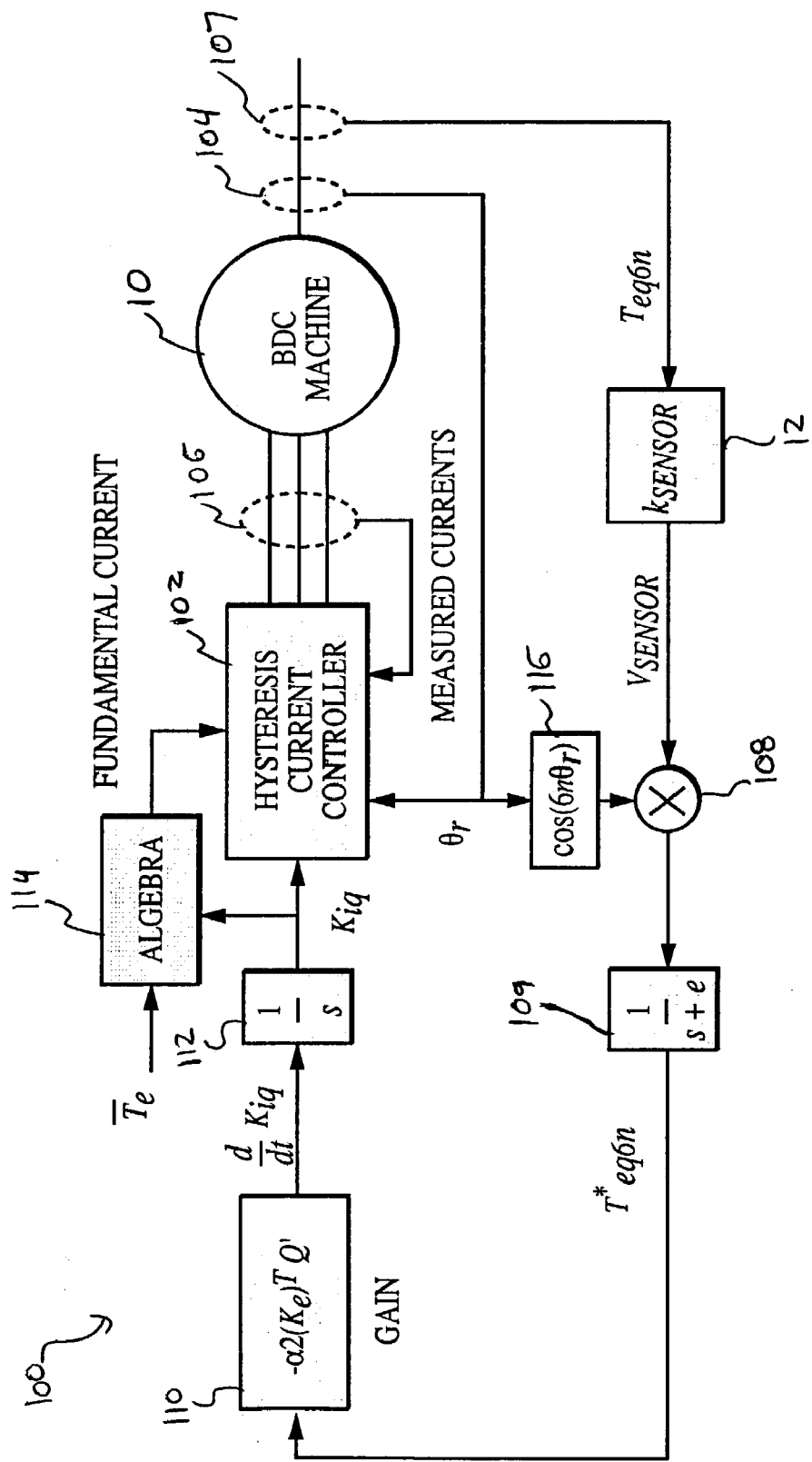
FIG. 6 is a block diagram of a closed-loop controller for a brushless DC (BDC) machine incorporating a torque ripple sensor according to a preferred embodiment of the present invention.

A representation of a torque ripple mitigation control system 100 for the motor 10 of FIG. 1 is shown in FIG. 6. The system 100 is a multiple-input-multiple-output (MIMO) controller that accepts a vector of measured torque ripple harmonics and manipulates a vector of commanded current harmonic amplitudes via the real time application of a steepest descent algorithm. The permanent magnet synchronous machine 10, operated as a BDC machine, is coupled to the exemplary closed-loop controller, and supplied with a current by a hysteresis current controller 102. Feedback is supplied to the current controller 102, including estimated or measured rotor position through position controller 104, and phase currents of the motor, through a current feedback element 106. The torque ripple and mitigation mechanism also includes the torque ripple sensor 12, which generates a time-domain signal representative of the torque ripple (indicated at 107), a multiplication block 108 which is used to partition the time-domain torque ripple signal $V_{sensor}$ into a vector containing amplitudes of the harmonic components that are to be mitigated, and a gain block 110, which is used to generate the desired current harmonics to mitigate the torque ripple. The result of the (gain) block 110 is fed into an integration block 112, which is coupled directly into the hysteresis current controller 102, and indirectly through an algebra block 114 also containing an average torque. The diagram in FIG. 6 illustrates the integration of these components into the motor control system for mitigating torque ripple harmonics that can be expressed as cosinusoidal functions (block 116) of rotor position. The same architecture is then repeated (not shown) to mitigate torque ripple harmonics that can be expressed as sinusoidal functions of rotor position.

To describe the control procedure in detail the permanent magnet machine 10, such as the BDC motor shown by example in FIG. 1, contains three concentrated stator windings, twelve rotor poles, and thirty-six stator slots. Though the machine 10 is a non-linear system, the relation between torque ripple harmonics, back-EMF harmonics, and current harmonics may be considered in the linear magnetic range without any concessions being made in the applicability of the technique. The voltage equations for the stator phase windings of the BDC machine are given by $$v_{as} = r_s i_{as} + p\lambda_{as} \quad (1)$$

$$v_{bs} = r_s i_{bs} + p\lambda_{bs} \quad (2)$$

$$v_{cs} = r_s i_{cs} + p\lambda_{cs} \quad (3)$$

where $v_{xs}$ is the 'x' phase to neutral voltage, $r_s$ is the phase resistance, $i_{xs}$ is the 'x' phase current, $\lambda_{xs}$ is the 'x' phase flux linkage, and p denotes differentiation with respect to time. The $p\lambda_{abcs}$ term represents voltage induced across the winding due to time-varying flux linkage, according to Faraday's law.

The phase flux linkages in (1)–(3) are a function of the magnetic flux produced by the phase currents (Ampere's law) as well as the flux produced by permanent magnets in the rotor. Saliency and magnetic saturation are neglected for simplicity and without loss in generality. Neglecting these effects, the coupling between phase currents and phase flux linkages is independent of rotor position and can be considered as constant inductances. Assuming constant inductances, the flux linkages of BDC machines can be expressed in a form:

$$\lambda_{as} = L_{asas}i_{as} + L_{asbs}i_{bs} + L_{ascs}i_{cs} + \lambda_{asm} \quad (4)$$

$$\lambda_{bs} = L_{bsas}i_{as} + L_{bsbs}i_{bs} + L_{bscs}i_{cs} + \lambda_{bsm} \quad (5)$$

$$\lambda_{cs} = L_{csas}i_{as} + L_{csbs}i_{bs} + L_{cscs}i_{cs} + \lambda_{csm} \quad (6)$$

where $L_{xsys}$ are 'x' phase to 'y' phase inductances and $\lambda_{xsm}$ represents effects of the permanent magnets on the respective stator phase.

In general, the flux produced by a permanent magnet is independent of the rotor position. However, the amount of flux from the magnet that crosses a phase winding is a function of rotor position. For BDC machines with distributed windings, the coupling between a rotor magnet and a stator phase winding can often be represented as a pure sinusoid. However, the exemplary machine 10 of FIG. 1 has concentrated stator windings. Therefore, $p\lambda_{abcsm}$ is expanded to include several harmonic coefficients. Specifically, the flux linkage can be expressed as:

$$\lambda_{asm} = \lambda'_m \sum_{m=1}^{N} \kappa_{en} \sin(n\theta_r) \quad (7)$$

$$\lambda_{bsm} = \lambda'_m \sum_{m=1}^{N} \kappa_{en} \sin(n(\theta_r - 120°)) \quad (8)$$

$$\lambda_{csm} = \lambda'_m \sum_{m=1}^{N} \kappa_{en} \sin(n(\theta_r + 120°)) \quad (9)$$

where $\kappa_{en}$ is the magnitude of the $n^{th}$ Fourier harmonic coefficient, $\lambda'_m$ is the amplitude of the fundamental component of $\lambda_m$, and $\theta_r$ is the electrical rotor position. Specifically, the rotor position is defined such that at $\theta_r=0$, no fundamental rotor flux links the as-winding; at $\theta_r=90°$, the fundamental component of rotor flux linking the as-winding is maximum. The 'e' denotes relationship to the machine back-EMF.

The sources of torque ripple are the interaction of back-EMF and stator currents and cogging torque. In other machines, there can also be torque ripple from saliency of the rotor. The back-EMF of a permanent magnet synchronous machine is the electric potential induced on a phase winding by a permanent magnet. This is equivalent to the open-circuit voltage measured between a winding terminal and the neutral of the machine when the rotor angular velocity is nonzero. The back-EMF is determined by differentiating (7)–(9) with respect to time. It can be expressed as:

$$e_{as} = \omega_r \lambda'_m \sum_{n=1}^{N} n\kappa_{en} \cos(n\theta_r) \quad (10)$$

$$e_{bs} = \omega_r \lambda'_m \sum_{n=1}^{N} n\kappa_{en} \cos(n(\theta_r - 120°)) \quad (11)$$

$$e_{cs} = \omega_r \lambda'_m \sum_{n=1}^{N} n\kappa_{en} \cos(n(\theta_r + 120°)) \quad (12)$$

where $\omega_r$ is the electrical angular velocity of the rotor.

The dynamics of the rotor are established by summing the torques applied to the shaft of the machine 10. Specifically, applying Newton's second law to the rotor shaft, $$p\omega_r = \frac{P}{2J}\left(T_e - B_m \frac{2}{P}\omega_r - T_L\right) \quad (13)$$

$$p\theta_r = \omega_r \quad (14)$$

where $T_e$ is the electromagnetic torque, $T_L$ is the load torque, J the rotor inertia, and $B_m$ the frictional coefficient of rotation. The load torque represents an input to the machine 10; however, the electromagnetic torque results from the interaction between the magnetic fields produced by current in the stator windings and the magnetic fields produced by the rotor magnet. The torque produced by electric machines can be determined from the co-energy of the coupling field. Specifically, $$T_e = \frac{\partial}{\partial \theta_r} W_c(\lambda, \theta_r) \quad (15)$$

where $$W_c \equiv \int \sum_{n=1}^{3} \lambda_n di_n + W_{pm}(\theta_r) \quad (16)$$

In (16) $W_c$ represents the co-energy of the coupling field and $W_{pm}$ is the energy produced by the permanent magnet. Using the winding flux linkages in (16) the co-energy can be expressed in terms of stator currents and rotor magnet flux as $$W_c = \frac{1}{2}L_{ss}(i_{as}^2 + i_{bs}^2 + i_{cs}^2) - L_m(i_{as}i_{bs} + i_{as}i_{cs} + i_{bs}i_{cs}) + \quad (17)$$

$$\lambda'_m i_{as} \sum_{n=1}^{N} \kappa_{en}\sin(n\theta_r) + \lambda'_m i_{bs} \sum_{n=1}^{N} \kappa_{en}\sin(n(\theta_r + 120°)) +$$

$$\lambda'_m i_{cs} \sum_{n=1}^{N} \kappa_{en}\sin(n(\theta_r - 120°)) + W_{pm}(\theta_r)$$

A closed-form expression for magnetic torque can be obtained by differentiating (17) with respect to rotor position, yielding:

$$T_e = \frac{P}{2}\left[i_{as}\left(\lambda'_m \sum_{n=1}^{N} n\kappa_{en}\cos(n\theta_r)\right) + i_{bs}\left(\lambda'_m \sum_{n=1}^{N} n\kappa_{en}\cos(n(\theta_r - 120°))\right) + \quad (18)\right.$$

$$\left. i_{cs}\left(\lambda'_m \sum_{n=1}^{N} n\kappa_{en}\cos(n(\theta_r - 120°))\right)\right] + T_{cog}(\theta_r)$$

In (18) $T_{cog}$ is the torque that results from differentiating $W_{pm}$ with respect to rotor position. This torque is the cogging torque resulting from the non-uniform airgap produced by stator slots. The summation terms in (18) result from harmonics of the flux produced by the permanent magnet. Since the machine has 12 poles and 36 stator teeth, cogging torque harmonics appear as $6^{th}$ order harmonics (n={6,12,18, . . . }) of the electrical rotor speed. These harmonics are a function of the machine geometry and winding configuration. The cogging torque can be expanded as a Fourier series:

$$T_{cog} = \sum_{n=1}^{N} T_{cogq6n}\cos(6n\theta_r) + T_{cogd6n}\sin(6n\theta_r) \quad (19)$$

Figure 7:
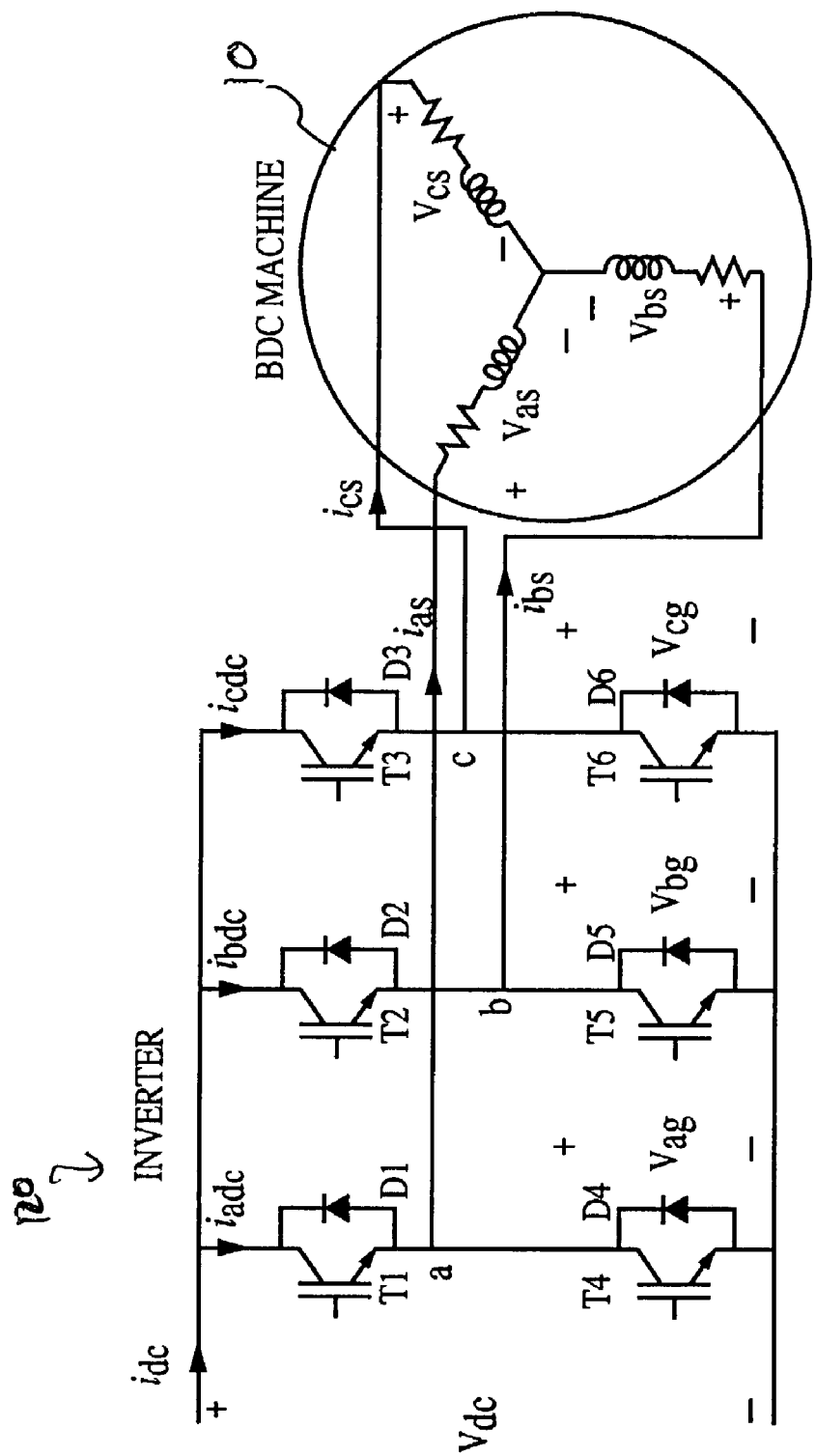
FIG. 7 is a schematic diagram of a brushless DC (BDC) motor with a six-pulse inverter system.

The phase currents of the machine 10 can be controlled using, for example, an inverter circuit, such as the inverter circuit 120 shown in FIG. 7 coupled to the BDC machine. The stator current harmonics are used to substantially eliminate torque ripple. To establish an expression for torque that includes harmonics, the phase currents are expressed in terms of a Fourier series as:

$$i_{as} = \sum_{n=1}^{N} \kappa_{iqn}\cos(n\theta_r) + \kappa_{idn}\sin(n\theta_r) \quad (20)$$

$$i_{bs} = \sum_{n=1}^{N} \kappa_{iqn}\cos(n(\theta_r - 120°)) + \kappa_{idn}\sin(n(\theta_r - 120°)) \quad (21)$$

$$i_{cs} = \sum_{n=1}^{N} \kappa_{iqn}\cos(n(\theta_r + 120°)) + \kappa_{idn}\sin(n(\theta_r + 120°)) \quad (22)$$

The inverter circuit 120 shown in FIG. 7 shows a machine/6-pulse inverter system. A 3-phase permanent magnet machine operated as a BDC machine is typically controlled using a 6-pulse inverter. Switching of transistors T1–T6 is used to regulate either the phase voltage or phase current applied to the machine, as will be understood by those skilled in the art.

The stator current harmonics are used to eliminate torque ripple. Using circuit analysis, it can be shown that for balanced wye-connected machines, torque ripple results from odd-numbered non-triplen harmonics of the back-EMF and the winding currents. Specifically, $\kappa_{em}$, $\kappa_{idm}$, and $\kappa_{iqm}$ are nonzero for m∈{1,5,7,11,13 ... }. Substituting (20)–(22) into (18), and manipulating the final result, the torque may be represented as $$T_e = \overline{T}_e + \sum_{n=1}^{N} T_{eq6n}\cos(6n\theta_r) + T_{ed6n}\sin(6n\theta_r) \quad (23)$$

where $$\overline{T}_e = \frac{3P\lambda'_m}{4} \sum_{m \in M} \kappa_{em}\kappa_{iqn} \quad (24)$$

$$T_{eq6n} = \frac{3P\lambda'_m}{4} \sum_{m \in M} (\kappa_{e(m+6n)} + \kappa_{e(m-6n)})\kappa_{iqm} + T_{cogq} \quad (25)$$

$$T_{ed6n} = \frac{3P\lambda'_m}{4} \sum_{m \in M} (\kappa_{e(m+6n)} + \kappa_{e(m-6n)})\kappa_{idm} + T_{cogd} \quad (26)$$

The torque ripple amplitudes are defined as:

$$T_{e6n} = \sqrt{(T_{eq6n})^2 + (T_{ed6n})^2} \quad (27)$$

Thus, the total torque of equation (23) is modeled as a sum of average torque (equation 24) and harmonic torque that is represented as cosinusoidal components of electrical rotor position (amplitudes given in equation 25) and harmonic torque that is represented as sinusoidal functions of the electrical rotor position (amplitudes given in equation 26). The amplitudes given in equation 25 are herein defined as q-axis components of the torque ripple while the amplitudes given in equation 26 are defines as the d-axis components of the torque ripple. Measuring the torque output of an electric machine can greatly reduce the task of torque ripple mitigation.

Figure 5:
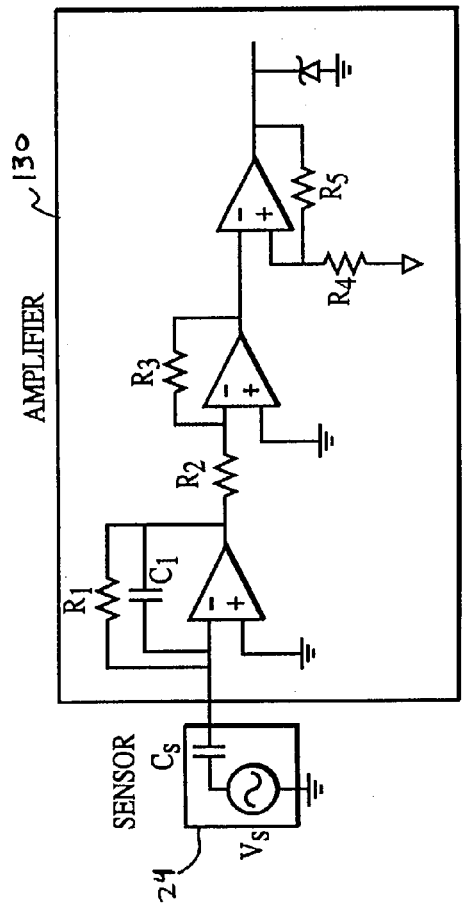
FIG. 5 is an electrical schematic of a torque ripple sensor and an amplifier for amplifying and conditioning the torque ripple sensor output.

There is a significant amount of expense associated with mounting a load cell between a drive system and its load, and most load cells do not have the bandwidth required to measure torque ripple. However, actual torque values are not required for ripple mitigation. Rather, disturbances in the machine housing or mount system can be used as an indicator of torque ripple amplitude. Therefore, a load cell is not required. The two conductive layers 30, 32 of the film-type piezoelectric element 24 preferably formed by coating a PVDF film on each side with silver ink create a significant source capacitance. The combination of this characteristic with the voltage produced during strain of the film yields a source voltage-series capacitance equivalent circuit for the film shown in the diagram for an amplifier 130 of FIG. 5. It should be noted that the source capacitance represented in FIG. 5 shows that the film-type piezoelectric element 24 is not used to measure average torque; instead, the piezoelectric element lends itself to measuring time-varying changes in strain and thus torque ripple.

Referring again to FIG. 6, in order to extract a value for each torque ripple harmonic (q-axis harmonics and d-axis components), the measured time varying voltage $V_{sensor}$ produced by the piezoelectric torque ripple sensor 12 can be separately correlated with the sine and cosine functions (cosine shown in block 116) of the desired harmonic, in the multiplication block 108. The correlation product is then low-pass filtered in real time using a low-pass filter (block 109) to extract a component that represents torque ripple harmonic amplitude. Specifically:

$$T^*_{eq6n} = \frac{1}{k_{sensor}} \int [v_{sensor}\cos(6n\omega_r t) - \varepsilon T^*_{eq6ns}]dt \quad (28)$$

$$T^*_{ed6n} = \frac{1}{k_{sensor}} \int [v_{sensor}\sin(6n\omega_r t) - \varepsilon T^*_{ed6ns}]dt \quad (29)$$

where $$v_{sensor} = k_{sensor}(T_e - \overline{T}_e) \quad (30)$$

$$T_{e6n}^* = \sqrt{(T_{eq6n}^*)^2 + (T_{ed6n}^*)^2} \quad (31)$$

Herein $T_{eq6n}^*$ and $T_{ed6n}^*$ represent the q-axis and d-axis components of the measured '$6n^{th}$' torque ripple harmonic respectively, $v_{sensor}$ is the voltage acquired from the torque ripple sensor 12, ∈ is the time constant of the filter 109, $k_{sensor}$ is the gain of the sensor, and $T_{e6n}^*$ is the magnitude of the measured '$6n^{th}$' harmonic. Though equations (28) and (29) are valid expressions of a low-pass filter, they appear rather unconventional; the presence of the subtracted term on the right explains why this form of expression for the filter 109 is often referred to as a "lossy integrator." Note that for ∈=0, equations (28) and (29) are equivalent to expressions for determining trigonometric series coefficients.

In the present invention, the desired current harmonics are determined through cost function analysis using the matrix gain element 110 of the controller 100. Specifically, a cost function is defined in terms of machine torque ripple, whereby the magnitudes of the torque ripple harmonics are included as terms in a quadratic equation. An example using two torque-ripple harmonics is developed as:

$$G = x^T Q x \quad (32)$$

where $$x = \begin{bmatrix} T_{e6} \\ T_{e12} \end{bmatrix} \quad (33)$$

$$Q = \begin{bmatrix} q_{11} & q_{12} \\ q_{21} & q_{22} \end{bmatrix} \quad (34)$$

In (32), G represents the system cost, x is the vector of torque ripple magnitudes, and each of the terms is a coefficient in the resulting quadratic function. Specifically, the q terms are chosen as a method of "weighting" the cost in favor of one harmonic over another.

In order to completely mitigate the magnitude of each torque ripple harmonic, the q-axis and d-axis components of each torque harmonic can be mitigated separately. Equation (32) may thus be expanded into its q-axis and d-axis components wherein $$G = \begin{bmatrix} T_{eq6} & T_{eq12} \end{bmatrix} \begin{bmatrix} q_{11} & q_{12} \\ q_{21} & q_{22} \end{bmatrix} \quad (35)$$

$$\begin{bmatrix} T_{eq6} \\ T_{eq12} \end{bmatrix} + \begin{bmatrix} T_{ed6} & T_{ed12} \end{bmatrix} \begin{bmatrix} q_{11} & q_{12} \\ q_{21} & q_{22} \end{bmatrix} \begin{bmatrix} T_{ed6} \\ T_{ed12} \end{bmatrix}$$

$$G = x_q^T Q x_q + x_d^T Q x_d \quad (36)$$

where the $x_q$ and $x_d$ vectors represent the q-axis and d-axis components of the torque ripple, respectively.

The cost function, however, is based on measured torque ripple quantities. For steady-state, (36) may be rewritten as $$G = \epsilon^2 [x_q^{*T} Q x_q^* + x_d^{*T} Q x_d^*] \quad (37)$$

where $$x_q^* = \begin{bmatrix} T_{eq6}^* \\ T_{eq12}^* \end{bmatrix} \quad (38)$$

$$x_d^* = \begin{bmatrix} T_{ed6}^* \\ T_{ed12}^* \end{bmatrix} \quad (39)$$

To isolate the current harmonic terms in (38), the torque ripple harmonics are expanded into expressions involving only constants and current harmonics as follows:

$$x_q^* = \frac{3P\lambda_m^r \epsilon}{4k_{sensor}} K_{iq1} \begin{bmatrix} \kappa_{e5} + \kappa_{e7} \\ \kappa_{e11} + \kappa_{e13} \end{bmatrix} + \frac{3P\lambda_m^r \epsilon}{4k_{sensor}} K_e K_{iq} + T_{cogq} \quad (40)$$

where (41)

$$K_E = \begin{bmatrix} \kappa_{e1} + \kappa_{e11} & \kappa_{e1} + \kappa_{e13} & \kappa_{e5} & \kappa_{e7} \\ \kappa_{e7} & \kappa_{e5} & \kappa_{e1} & \kappa_{e1} \end{bmatrix}$$

-continued $$K_{Iq} = \begin{bmatrix} K_{iq5} \\ K_{iq7} \\ K_{iq11} \\ K_{iq13} \end{bmatrix} \quad (42)$$

$$T_{cogq} = \begin{bmatrix} T_{cogq6} \\ T_{cogq12} \end{bmatrix} \quad (43)$$

In (41)–(42), $K_E$ is a matrix of Back-EMF coefficients, and $K_{Iq}$ is the vector representing the Fourier coefficients for each commanded q-axis current harmonic. In addition, only $x_q^*$ is expressed for the sake of brevity; $x_d^*$ may be expressed by merely substituting 'd' for 'q'.

In order to mitigate torque ripple, a closed-loop controller including gain block 110 is used to minimize the cost function G. The measured quantities $x_q^*$ and $x_d^*$ are used to manipulate the vectors $K_{Iq}$ and $K_{Id}$.

By allowing Q to be a diagonal matrix, the gradient of G with respect to the current vector $K_{Iq}$ reduces to $$\nabla_{iq} G = \frac{3P\lambda_m^r}{4} 2K_e^T Q K_{iq1} \begin{bmatrix} \kappa_{e5} + \kappa_{e7} \\ \kappa_{e11} + \kappa_{e13} \end{bmatrix} + \frac{3P\lambda_m^r}{4} 2K_e^T Q K_e K_{iq} + T_{cogq} \quad (44)$$

$$\nabla_{IqG} = 2K_E^T Q x_q^* \quad (45)$$

where the expression for $\nabla_{Id} G$ appears similar with 'q' replaced by 'd'. Thus, a solution for $K_{Iq}$ may be developed and duplicated for $K_{Id}$ as follows:

$$\frac{d}{dt} K_{I_q} = -\alpha \nabla_{Iq} G \quad (46)$$

$$\frac{d}{dt} K_{I_q} = -\alpha 2 K_E^T Q x_q^* \quad (47)$$

$$\frac{d}{dt} K_{I_d} = -\alpha 2 K_E^T Q x_d^* \quad (48)$$

where (46)–(48) represents the application of the steepest-descent algorithm in real time and 'α' is a user-defined control constant, used to adjust the time constant. Though the $K_E$ back-EMF coefficient matrix is still present in the solution, this form allows much more flexibility; the coefficients may be estimated or chosen rationally.

By observation of equations (47) and (48), it may be noted that a steady state solution to $K_{Iq}$ ($K_{Id}$) is determined when $x_q$ ($x_d$) is a zero-vector. This form of the solution may be realized as a multiple-input-multiple-output (MIMO) control system that measures several torque ripple harmonics and manipulates several current harmonics to compensate.

The voltage produced by the film 24 is typically not of sufficient amplitude or quality to be imported directly into a DSP or similar computer control device. In addition, the capacitive source impedance of the film 24 alters the frequency response of the induced voltage. Therefore, the induced voltage by the film 24 preferably is amplified and conditioned for use by a mitigation mechanism, such as a microcontroller. The control may be implemented in a commercial digital signal processor (DSP).

For amplifying the initial voltage, the piezoelectric element preferably is coupled via the conductive layer to an amplifier such as the amplifier circuit 130 shown by example in FIG. 5. The exemplary amplifier 130 shown in FIG. 5 is a three-stage operational amplifier circuit. The two conductive layers 30, 32 of the film 24 contain a significant source capacitance as well, resulting in a source voltage-series capacitance equivalent circuit for the piezoelectric element. The piezoelectric film 24 includes a voltage source $V_S$ and a capacitor $C_S$. The first stage of the amplifier 130 contains a capacitor in a feedback loop to cancel the effects of the capacitive input impedance. The resistor in the feedback loop is placed to substantially prevent the feedback capacitor from acquiring a charge and thus an offset voltage. The second stage amplifier provides bulk gain. The third stage provides an offset voltage sufficient to substantially prevent negative voltages from being input to the DSP. A power supply 132 (see FIG. 1) may be connected to supply power to the amplifier 130.

In an experiment conducted by the present inventors, a DSP was programmed to implement current control with torque ripple feedback. Due to the limitations of the speed of the DSP in the conducted experiment, however, the control was limited to monitoring one torque ripple harmonic and manipulating one current harmonic. Specifically, the DSP was programmed to maintain a given fundamental current while simultaneously mitigating the $6^{th}$ harmonic torque ripple through manipulation of the $5^{th}$ current harmonic. It may be observed in the analysis given by (29)–(42) that the $6^{th}$ harmonic torque ripple may be mitigated when only the $5^{th}$ harmonic is represented by manipulating $K_{iq}$ and $K_{id}$. The control equations are thus given by the following:

$$\frac{d}{dt}K_{iq5} = -\alpha 2 q_{11} T^*_{eq6} \quad (49)$$

$$\frac{d}{dt}K_{id5} = -\alpha 2 q_{11} T^*_{ed6} \quad (50)$$

Figure 8A:
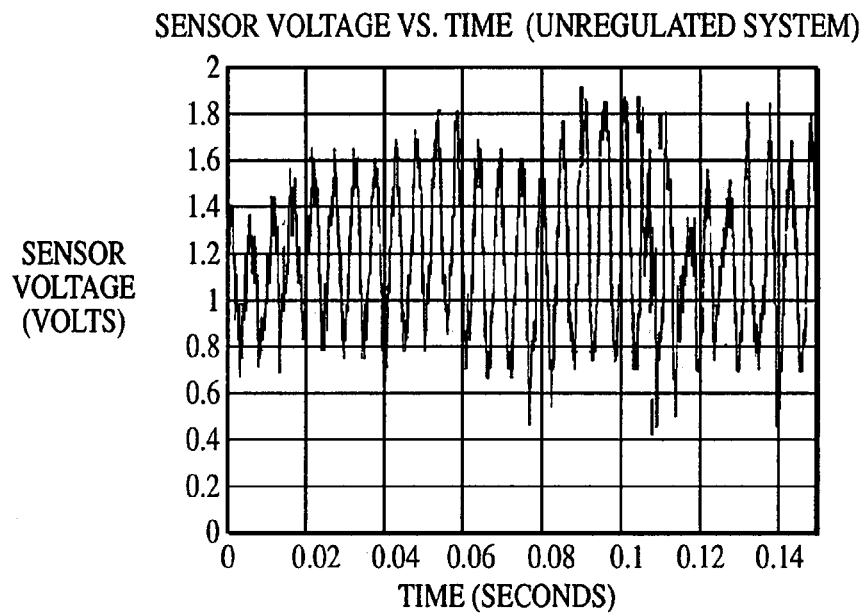
FIGS. 8A–8D are graphs showing measured torque ripple and A-phase current before and after mitigation control using a preferred method of the present invention.
Figure 8B:
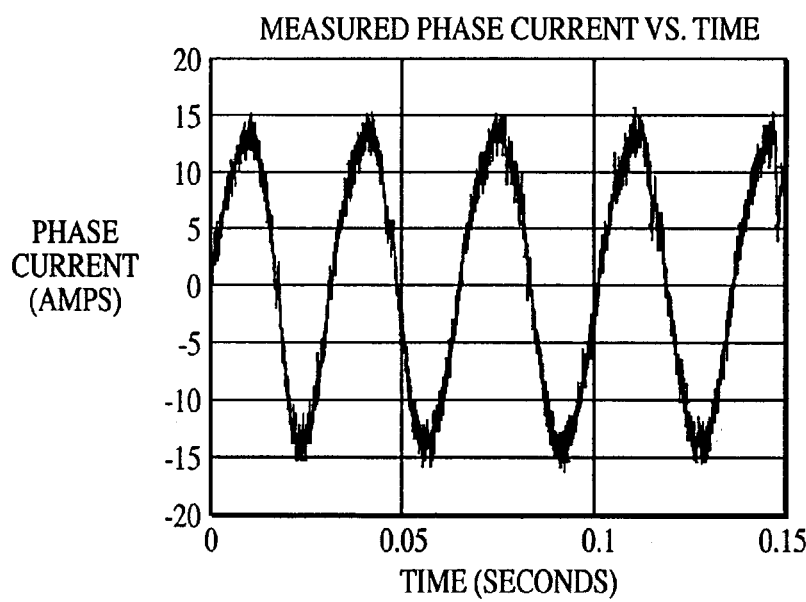
Figure 8C:
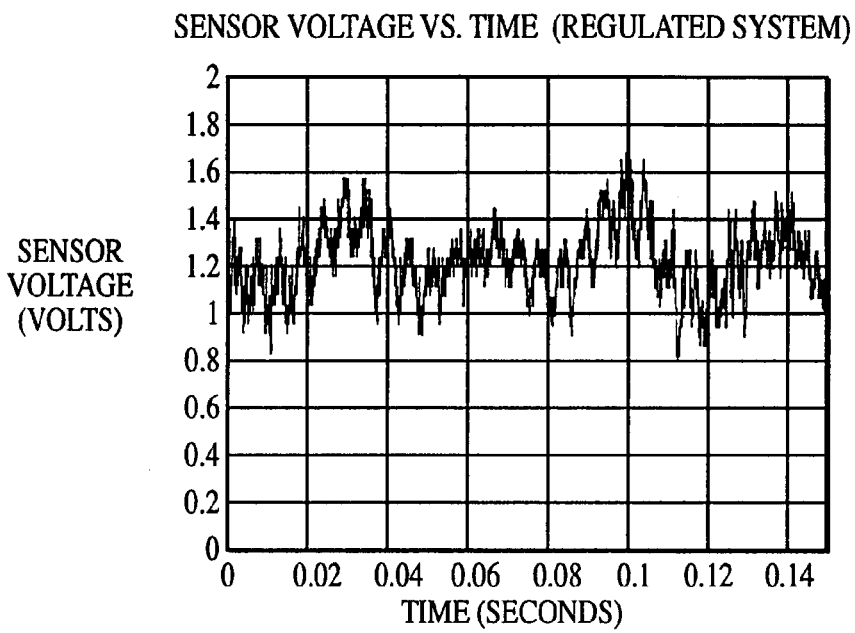
Figure 8D:
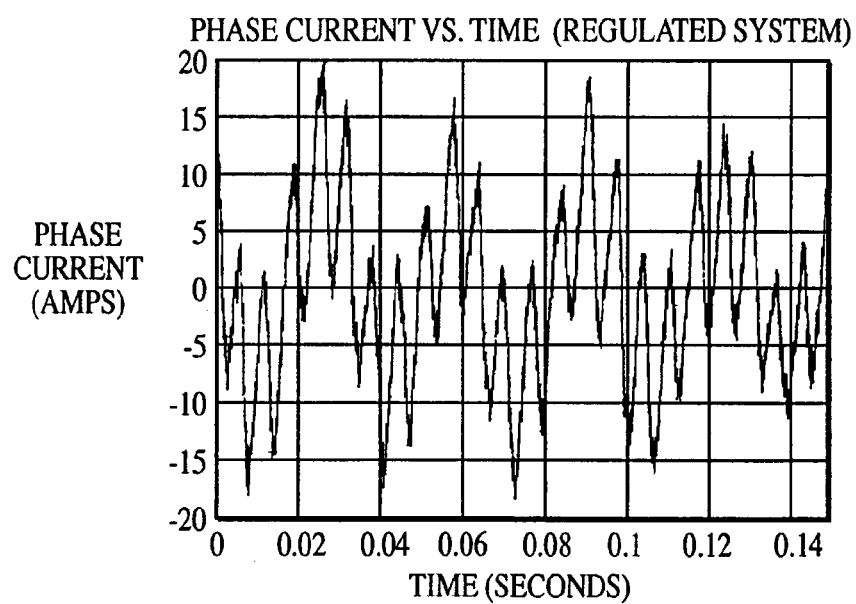

The torque ripple and phase current measurements were recorded before and after the torque ripple feedback control was implemented. The hardware verification was performed with the machine 10 driven mechanically by a Dynamometer with a constant speed of 300 RPM. The machine 10 was driven electrically by an inverter operating under hysteresis current control, whereby the desired fundamental current was 12 Amps and the desired $5^{th}$ harmonic current was decided according to (49) and (50). The measured results of the mitigation control are shown in FIGS. 8A–8D. Specifically shown are the measured torque ripple amplitudes (FIG. 8A) and phase currents (FIG. 8B) prior to mitigation control, and the same values after the mitigation control was implemented (FIGS. 8C and 8D, respectively).

The present torque ripple sensor 12, 40, 70 may be used for sensing torque ripple of machines such as, but not limited to, variable reluctance stepper motors, permanent magnet stepper motors, switched reluctance motors, buried permanent magnet synchronous machines, dual-fed induction machines, and/or synchronous reluctance motors. Though the exemplary control system 100 described above is primarily directed to BDC motors, one skilled in the art will appreciate the adjustments that may be needed to the control design of the preferred embodiments previously disclosed to implement control systems for other permanent magnet machines.

In addition, by using a closed-loop torque ripple feedback, a separate, surface mounted permanent magnet machine (such as a motor) or other device may be employed for the principal purpose of creating torque ripple to mechanically counteract the torque ripple of another, main machine. The separate permanent magnet machine is preferably smaller in size than the main machine, and is able to produce sufficient torque to counteract the torque ripple of the main machine. The separate machine produces torque ripple out of phase with the torque ripple of the main machine to eliminate torque ripple of the main machine.

Although the use of a sensor requires additional hardware, in most current-control based drive systems, the cost and added computational complexity can be made minimal. Further, by using feedback-based control, the mitigation strategy is less sensitive to changes in machine parameters that can result from saturation or imprecise knowledge of the machine.

The torque ripple sensor 12, 40, 70 may be employed separately, without a compensation mechanism. For example, the torque ripple sensor 12, 40, 70 may be used in a production line, in which one might test individual machines, and reject those that are found to produce excessive vibration. The present invention may be used for various applications such as, but not limited to, making permanent magnet electric machines (such as motors) quieter on electric boats; and reducing vibrations in machines used in automobile power steering and/or wiper motors.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An apparatus for sensing fluctuations in torque from a permanent magnet machine, the permanent magnet machine being contained in a housing, the apparatus comprising:
   a piezoelectric sensor coupled to the permanent magnet machine and a fixed point relative to the permanent magnet machine to receive a transmitted reaction force produced by torgue fluctuations due to rotation of a rotor of the permanent magnet machine, said piezoelectric sensor producing a sensor signal corresponding to an amplitude of the reaction force;
   an output line from said piezoelectric sensor for outputting the sensor signal.

2. An apparatus for sensing fluctuations in torque for a rotational electromagnetic motor, the apparatus comprising:
   a piezoelectric sensor disposed relative to the motor and a fixed point relative to the motor to receive a transmitted reaction force from the motor produced by torque fluctuations due to rotation of a rotor of the motor, said piezoelectric sensor producing a sensor signal corresponding to an amplitude of the reaction force;
   an output line from said piezoelectric sensor for outputting the sensor signal.

3. The apparatus of claim 2 wherein said piezoelectric sensor is positioned relative to a housing of the motor and the fixed point to receive said reaction force.

4. The apparatus of claim 3 wherein the fixed point comprises a mount attached to a fixed substrate.

5. The apparatus of claim 3 wherein the fixed point is a fixed substrate, land wherein said piezoelectric sensor is sandwiched between a mount fixed to the motor and said fixed substrate.

6. The apparatus of claim 4 wherein the mount comprises a bracket.

7. The apparatus of claim 3 wherein said piezoelectric sensor comprises a plate-type sensor.

8. The apparatus of claim 2 wherein said piezoelectric sensor comprises an annular piezoelectric element, and wherein said annular piezoelectric element is disposed between a housing of the motor and a substrate on which the housing is mounted.

9. The apparatus of claim 3 wherein said piezoelectric sensor is attached to a motor housing and stretched between the motor and the fixed point, whereby rotation of the motor caused by the fluctuations stretches and releases said piezoelectric sensor to create strain.

10. The apparatus of claim 2 wherein said piezoelectric sensor includes a piezoelectric element insulated by a plurality of non-conducting elements.

11. The apparatus of claim 10 wherein said plurality of non-conducting elements comprises a coating on opposing surfaces of said piezoelectric element.

12. The apparatus of claim 10 wherein at least one of said plurality of nonconductive elements comprises a ceramic substrate.

13. The apparatus of claim 10 wherein said piezoelectric element comprises a poled thin-film of at least one of lead zirconate titanate (PZT) and polyvinylidene fluoride (PVDF).

14. The apparatus of claim 2 wherein said piezoelectric sensor produces a signal linearly proportional to reaction forces of the motor.

15. An apparatus for mitigating fluctuations in torque for a rotational electromagnetic motor, the apparatus comprising:
a piezoelectric sensor disposed with respect to the motor and a fixed point relative to the motor to receive a transmitted reaction force due to rotation of a rotor of the motor, said piezoelectric sensor producing a sensor signal corresponding to an amplitude of said reaction force;
a feedback mechanism coupled to said sensor for receiving said sensor signal and to said motor, said feedback mechanism supplying a current control signal to the motor based on said sensor signal to mitigate fluctuations in torque.

16. The apparatus of claim 15 wherein said feedback mechanism comprises:
a controller that receives said sensor signal from said piezoelectric sensor and produces said current control signal to said motor.

17. The apparatus of claim 16 wherein said motor comprises a permanent magnet synchronous machine, and wherein said feedback mechanism is coupled to said motor for receiving a rotor position and phase signal for the motor.

18. The apparatus of claim 15 wherein said feedback mechanism comprises an active vibration noise canceling actuator used to reduce vibration transmitted to said piezoelectric sensor based on said signal from said piezoelectric sensor.

19. The apparatus of claim 16 wherein said feedback mechanism further comprises:
a signal amplifier and conditioner coupled to said piezoelectric sensor for amplifying said sensor signal to produces an amplified signal, which is coupled to said controller.

20. The apparatus of claim 16 wherein said feedback mechanism further comprises:
a multiplication element for acquiring values for harmonics of the torque fluctuations.

21. The apparatus of claim 20 wherein said feedback mechanism further comprises:
a low-pass filter coupled to said multiplication element for filtering an output of said multiplication element.

22. The apparatus of claim 16 wherein said controller further comprises:
a gain matrix that defines a cost function in terms of torque ripple of the motor.

23. The apparatus of claim 16 wherein said controller reaches steady state when a predetermined cost function involving elements of torque vectors are minimized.

24. The apparatus of claim 16 wherein said current controller substantially eliminates at least one of the sixth and twelfth harmonics of torque ripple.

25. A method of reducing torque ripple in a rotational electromagnetic motor, the method comprising the steps of:
providing a piezoelectric sensor in a position relative to the motor to receive rotational reaction forces transmitted by the motor due to torque ripple and generate a sensor signal correlating to an amplitude of said rotational reaction forces;
processing said sensor signal to produce a control signal including commanded current harmonics;
supplying said control signal to a current controller of the motor to reduce the torque ripple.

26. The method of claim 25 wherein said providing step comprises placing said piezoelectric sensor relative to the motor and a fixed point.

27. The method of claim 25 wherein said processing step comprises the steps of:
correlating said sensor signal with functions of harmonics to create torque values;
filtering said torque values;
defining a cost function in terms of torque ripple based on said filtered values;
minimizing said cost function to produce current for minimizing the torque ripple.

28. An apparatus for sensing fluctuations in torque from a rotational electromagnetic motor, the motor being contained in a housing, the apparatus comprising:
a piezoelectric sensor coupled to the motor and a fixed point relative to the motor to receive a transmitted reaction force produced by torque fluctuations due to rotation of a rotor of the motor, said piezoelectric sensor producing a sensor signal corresponding to an amplitude of the reaction force;
an output line from said piezoelectric sensor for outputting the sensor signal;
a processor for receiving the output sensor signal from said output line and extracting a measurement of torque fluctuations from the sensor signal.

29. The apparatus of claim 28 further comprising:
a feedback mechanism coupled to said processor for supplying a current control signal to said rotational motor based on the extracted measurement of torque fluctuations.

30. The apparatus of claim 29, wherein the rotational motor comprises a permanent magnet synchronous machine.

31. An apparatus for sensing fluctuations in torque for a rotational electromagnetic motor, the apparatus comprising:

a rotational electromagnetic motor mounted to a fixed point, such that rotation of a rotor of said rotational motor produces vibrations relative to said fixed point;

a piezoelectric sensor mounted to said motor and said fixed point to receive a transmitted reaction force from the motor produced by torque fluctuations due to rotation of a rotor of the motor, said piezoelectric sensor producing a sensor signal corresponding to an amplitude of the reaction force due to a direct piezoelectric effect;

an output line from said piezoelectric sensor for outputting the sensor signal.

32. The apparatus of claim 31 further comprising:

a processor coupled to said output line for receiving the output sensor signal from said output line and extracting a measurement of torque fluctuations from the sensor signal.

33. The apparatus of claim 32 further comprising:

a feedback mechanism coupled to said processor for supplying a current control signal to said rotational motor based on the extracted measurement of torque fluctuations.

* * * * *

UNITED STATES PATENT AND TRADEMARK OFFICE
CERTIFICATE OF CORRECTION

PATENT NO. : 7,117,754 B2
APPLICATION NO. : 10/281883
DATED : October 10, 2006
INVENTOR(S) : Neely et al.

It is certified that error appears in the above-identified patent and that said Letters Patent is hereby corrected as shown below:

In the Issued Patent:

Column 8, line 54, please delete "$v_{cs} - r_s i_{cs} + p\lambda_{cs}$", and insert -- $v_{cs} = r_s i_{cs} + p\lambda_{cs}$ -- therefor.

Column 9, line 26, after "$\lambda_{asm} =$", please delete "$\lambda'_m \sum_{m=1}^{N} \kappa_{en} \sin(n\theta_r)$", and insert -- $\lambda'_m \sum_{n=1}^{N} \kappa_{en} \sin(n\theta_r)$ -- therefor.

Column 9, line 29, after "$\lambda_{bsm} =$", please delete "$\lambda'_m \sum_{m=1}^{N} \kappa_{en} \sin(n(\theta_r - 120°))$", and insert -- $\lambda'_m \sum_{n=1}^{N} \kappa_{en} \sin(n(\theta_r - 120°))$ -- therefor.

Column 9, line 32, after "$\lambda_{csm} =$", please delete "$\lambda'_m \sum_{m=1}^{N} \kappa_{en} \sin(n(\theta_r - 120°))$", and insert -- $\lambda'_m \sum_{n=1}^{N} \kappa_{en} \sin(n(\theta_r - 120°))$ -- therefor.

Column 11, line 51, please delete "$\overline{T}_e = \frac{3P\lambda'_m}{4} \sum_{m \varepsilon M} \kappa_{em} \kappa_{iqn}$", and insert -- $\overline{T}_e = \frac{3P\lambda'_m}{4} \sum_{m \varepsilon M} \kappa_{em} \kappa_{iqm}$ -- therefor.

Column 12, line 31, please delete "$T_{e6n}* = \sqrt{(T_{eq6n}{}^*)^2 + (T_{ed6n}{}^*)^2}$", and insert -- $T^*_{e6n} = \sqrt{(T^*_{eq6n})^2 + (T^*_{ed6n})^2}$ -- therefor.

Column 12, line 32, after "Herein", please delete "$T_{eq6n}*$ and $T_{ed6n}*$", and insert -- $T^*_{eq6n}$ and $T^*_{ed6n}$ -- therefor.

Column 12, line 55, after "ripple sensor 12," please delete "$\epsilon$", and insert -- $\varepsilon$ -- therefor.

UNITED STATES PATENT AND TRADEMARK OFFICE
CERTIFICATE OF CORRECTION

PATENT NO. : 7,117,754 B2
APPLICATION NO. : 10/281883
DATED : October 10, 2006
INVENTOR(S) : Neely et al.

It is certified that error appears in the above-identified patent and that said Letters Patent is hereby corrected as shown below:

In the Issued Patent (cont'd):

Column 12, Line 56, after "and", please delete "$T_{e6n}*$", and insert -- $T^*_{c6n}$ -- therefor.

Column 12, line 62, after "for", please delete "$\epsilon=0$", and insert -- $\varepsilon=0$ -- therefor.

Column 13, line 44, please delete "$G = \epsilon^2 \lfloor x_q *^T Q x_q * + x_d *^T Q x_d * \rfloor$", and insert -- $G = \varepsilon^2 \lfloor x_q *^T Q x^*_q + x^{*T}_d Q x^*_d \rfloor$ -- therefor.

Column 14, line 30, please delete "$\nabla_{lqG} = 2 K_E^{TQx}{}_q$", and insert -- $\nabla_{lq} G = 2 K_E^T Q x^*_q$ -- therefor.

Column 16, line 65, after "substrate," please delete "land", and insert --and-- therefor.

Signed and Sealed this

Seventh Day of August, 2007

JON W. DUDAS
*Director of the United States Patent and Trademark Office*